United States Patent [19]
Meguro et al.

[11] Patent Number: 6,037,070
[45] Date of Patent: Mar. 14, 2000

[54] MAGNETIC RECORDING MEDIUM AND METHOD FOR MANUFACTURING BINDER FOR MAGNETIC RECORDING MEDIUM

[75] Inventors: Katsuhiko Meguro; Hiroshi Hashimoto, both of Odawara, Japan

[73] Assignee: Fuji Photo Film Co., Ltd., Kanagawa, Japan

[21] Appl. No.: 08/883,903

[22] Filed: Jun. 27, 1997

[30] Foreign Application Priority Data

| Jun. 28, 1996 | [JP] | Japan | ................................ 8-169346 |
| Jun. 28, 1996 | [JP] | Japan | ................................ 8-169347 |
| Jun. 28, 1996 | [JP] | Japan | ................................ 8-169348 |

[51] Int. Cl.$^7$ ................................................. G11B 5/702
[52] U.S. Cl. ........................ 428/694 B; 428/694 BG; 428/694 BS; 428/900; 528/480; 528/491; 528/492; 210/500.22; 210/511; 523/310
[58] Field of Search ...................... 427/128; 428/694 B, 428/694 BG, 694 BS, 900; 528/440, 491, 492; 210/500.22, 511; 523/310

[56] References Cited

U.S. PATENT DOCUMENTS

| 4,529,661 | 7/1985 | Ninomiya et al. .................. 428/425.9 |
| 5,153,063 | 10/1992 | Okita et al. ............................ 428/336 |

OTHER PUBLICATIONS

Polymer Handbook, Third Edition. Edited by J. Brandrup and E. H. Immergut, John Wiley & Sons Publ pp. VII 233–237, 1989.

*Primary Examiner*—Stevan A. Resan
*Attorney, Agent, or Firm*—Sughrue, Mion, Zinn Macpeak & Seas, PLLC

[57] ABSTRACT

A poor solvent is used for removing low molecular weight components from a binder, which has weight average molecular weight within the range of 10,000 to 60,000, said poor solvent has a solubility parameter being different from solubility parameter of the binder by more than 1.3 and less than 2.3 and is a solvent such as acetonitrile having no active hydrogen, and a difference between solubility parameter of the solvent in the solution after mixing and solubility parameter of the binder is more than 1.0 and less than 2.0, said poor solvent is used for fractional precipitation, and the poor solvent being by 0.5 to 3 times as much as the quantity of the binder solution is added to separate the solution to a liquid phase where low molecular weight components are dissolved more and a liquid layer where high molecular weight components are dissolved more and the latter is taken up, or an ultrafiltration membrane is used to remove low molecular weight components, content of the low molecular weight components having molecular weight of not more than 5,000 are reduced to not more than 3 weight % of total weight of the binder, and said binder is used for formation of a magnetic layer and a lower coating layer of a magnetic recording medium.

23 Claims, No Drawings

MAGNETIC RECORDING MEDIUM AND METHOD FOR MANUFACTURING BINDER FOR MAGNETIC RECORDING MEDIUM

BACKGROUND OF THE INVENTION

The present invention relates to a magnetic recording medium comprising a magnetic layer having ferromagnetic powder and a binder dispersed in it, said magnetic layer being placed on a non-magnetic support member, and in particular, to a magnetic recording medium having excellent electromagnetic transfer characteristics and durability.

Magnetic recording medium is now widely used as recording tape, video tape, floppy disk, etc. Magnetic recording medium comprises a magnetic layer where ferromagnetic powder is dispersed in a binder, and said magnetic layer is placed on a non-magnetic support member.

Magnetic recording medium must be at high level in the properties such as electromagnetic transfer characteristics, running durability, and running performance. Specifically, an audio tape for reproducing musical sound must have high ability to reproduce original sound, and a video tape must have high electromagnetic transfer characteristics such as high ability to reproduce original picture.

In addition to high electromagnetic transfer characteristics as described above, magnetic recording medium must have good running durability. To obtain good running durability, abrasive material and lubricant are generally added to the magnetic layer.

In the equipment or device using the magnetic recording medium, there have been problems in that, when medium slides on and contacts a magnetic head, low molecular weight components in the binder of the magnetic recording medium migrate toward surface of the magnetic layer and are attached on the magnetic head. As a result, the magnetic head is often contaminated.

The contamination of the magnetic head causes deterioration of the electromagnetic transfer characteristics. In particular, in an equipment or a device for high density recording, number of revolutions of the magnetic head is high, being 9,600 rpm in case of a digital video tape recorder, 1,800 rpm in case of an analog video tape recorder for home use, and 5,000 rpm for a tape recorder for business use. Thus, sliding speed of the magnetic recording medium on the magnetic head is increased, and there is also a trend that the magnetic head is designed more and more in compact size such as thin film head. In this respect, there are strong demands to reduce and eliminate the contamination of the magnetic head caused by the components from the magnetic recording medium.

To solve the above problems, it is now practiced to increase hardness of the magnetic layer using a hard binder. Further, it is attempted to decrease the content of the low molecular weight component in the binder to prevent resin components in the binder from attaching on the magnetic head and from causing contamination of the head.

For example, JP-A-62229523 discloses a method for removing low molecular weight components having molecular weight of not more than 2,000, whereby magnetic coating material is coated and dried on a magnetic recording medium and the magnetic recording medium is then exposed in a supercritical fluid with temperature and pressure higher than critical values and low molecular weight components are extracted and removed using the supercritical fluid. However, this requires a pressure vessel, which is resistant to high temperature and high pressure, and this is disadvantageous for the use in industrial application. Also, there is a problem in that it is difficult to evenly remove the low molecular weight components from the binder in the magnetic recording medium, which is in wound state.

JP-A-63263629 (U.S. Pat. No. 5,153,063) discloses a method to reduce the low molecular weight components to less than 3 weight % by the methods such as: (1) conditioning of a polymerizing catalyst; (2) increase of molecular weight of the resin itself; and (3) fractional precipitation using poor solvents such as alcohols, aromatic compounds, aliphatic hydrocarbons, etc. after synthesis. More concretely, a method of fractional precipitation using hexane or a mixture of hexane/toluene (7:3) is described. However, when hexane is used, solubility of dilute phase is low, and the low molecular weight components cannot be removed completely. In case the hexane/toluene mixture solvent is used, solubility can be adjusted by the content of toluene, while yield is decreased because high molecular components are also dissolved.

Further, JP-A-0652539 discloses a method to reduce the context of the low molecular weight components having molecular weight of 400 to 1,300 to 0.5 to 2.5 weight OI, using the methods such as (1) re-precipitation in organic solvent such as toluene after synthesis of polyester polyurethane; (2) use of polyurethane purified by re-precipitation in organic solvent such as toluene; and (3) synthesis of raw material polyurethane having such structure as to prevent generation of low molecular weight components (such as long-chain diol, and cyclic diol). In the embodiments, the change to synthetic method not using diol as chain extender is described.

SUMMARY OF THE INVENTION

To solve the above problems, in the method for manufacturing a binder for a magnetic recording medium to remove low molecular components by fractional precipitation method in the present invention, a poor solvent is added to a solution where the binder is dissolved in a solvent, whereby the poor solvent has a solubility parameter being different from that of the binder by more than 1.3 and less than 2.3 and contains no active hydrogen, and further a difference between solubility parameter of the solvent in the solution after mixing and solubility parameter of the binder is more than 1.0 and less than 2.0, said poor solvent is added to a solution of a binder having weight average molecular weight of 10,000 to 60,000, and fractional precipitation is performed and the content of the low molecular weight components having molecular weight of not more than 5,000 is reduced to not more than 3 weight % of total weight of the binder.

The present invention also provides a method for manufacturing a binder for a magnetic recording medium as described above, wherein the poor solvent is acetonitrile or at least a mixture solvent containing acetonitrile.

The invention also provides a method for manufacturing a binder for a magnetic recording medium as described above, wherein a polar group of the binder is at least one type of polar groups selected from —$SO_3M$, —$PO(OM)_3$, —COOM (where M represents a hydrogen atom, an alkali metal, or an ammonium salt), and amino group, and the content of the polar groups is within the range of $1\times10^{-5}$ to $60\times10^{-5}$ eq/g.

The present invention also provides a magnetic recording medium comprising a magnetic layer containing at least ferromagnetic powder and a binder, said magnetic layer being placed on a non-magnetic support member, whereby a poor solvent has a solubility parameter being different from that of the binder by more than 1.3 and less than 2.3 and contains no active hydrogen, and further a difference between solubility parameter of the solvent in the solution after mixing and solubility parameter of the binder is more than 1.0 and less than 2.0, said poor solvent is used in a solution of the binder having weight average molecular weight of 10,000 to 60,000, fractional precipitation is performed using said poor solvent, and the content of low molecular weight components having molecular weight of not more than 5,000 is reduced to not more than 3 weight % of total weight of the binder.

Further, the present invention provides a magnetic recording medium, comprising at least two layers or more, i.e. a lower coating layer, which contains at least one of magnetic powder or non-magnetic powder, and is placed on a non-magnetic support member, and a magnetic layer containing ferromagnetic metal powder and a binder provided on said lower coating layer, whereby at least one of the binders in said lower coating layer or said magnetic layer is produced by fractional precipitation method using a poor solvent, said poor solvent has a solubility parameter being different from that of the binder by more than 1.3 and less than 2.3 and contains no active hydrogen, and further a difference between solubility parameter of the solvent in the solution after mixing and solubility parameter of the binder is more than 1.0 and less than 2.0, said poor solvent is added to a solution of the binder having weight average molecular weight within the range of 10,000 to 60,000, and the content of low molecular weight components having molecular weight of not more than 5,000 is reduced to not more than 3 weight % of total weight of the binder.

Also, the present invention provides a magnetic recording medium, which comprises a magnetic layer containing at least ferromagnetic powder and a binder, said magnetic layer being placed on a non-magnetic support member, whereby a poor solvent by 0.5 to 3 times as much as the quantity of the solution of the binder is added to the binder solution to separate the solution to a liquid layer where low molecular weight components are dissolved more and a liquid layer where high molecular weight components are dissolved more, and the latter is taken up to remove the low molecular weight components from the binder.

The invention also provides a magnetic recording medium, which comprises a binder having weight average molecular weight of 10,000 to 60,000 and containing a polar group of $1 \times 10^{-5}$ to $60 \times 10^{-5}$ eq/g, and low molecular weight components having molecular weight of not more than 5,000 is reduced to not more than 3 weight % of total weight of the binder.

The invention further provides the magnetic recording medium as described above, wherein said poor solvent does not contain active hydrogen in the molecule.

The invention also provides the magnetic recording medium as described above, wherein a polar group of the binder is —COOM, —PO(OM)$_3$, —SO$_3$M (where M represents a hydrogen atom, an alkali metal or an ammonium salt) or amino group.

The present invention also provides a magnetic recording medium, comprising at least two layers or more, i.e. a lower coating layer, which contains at least one of magnetic powder or non-magnetic powder, and is placed on a non-magnetic support member, and a magnetic layer comprising ferromagnetic metal powder and a binder provided on said lower coating layer, whereby low molecular weight components are removed from at least one of the binder in the lower coating layer or the binder in the magnetic layer, i.e. a poor solvent being by 0.5 to 3 times as much as the quantity of the solution of the binder is added to separate the solution to a liquid layer where low molecular weight components are dissolved more and a liquid layer where high molecular weight components are dissolved more, and the latter is taken up to remove the low molecular weight components.

The invention also provides a method for manufacturing a binder for a magnetic recording medium, whereby a poor solvent being by 0.5 to 3 times as much as the quantity of a solution of the binder is added to the binder solution to separate the solution to a liquid layer where low molecular weight components are dissolved more and a liquid layer where high molecular components are dissolved more, and by taking up the latter, the low molecular weight components are removed from the binder.

The invention further provides a method for manufacturing a binder for a magnetic recording medium, whereby low molecular weight components are removed using a ultrafiltration membrane from a binder having weight average molecular weight within the range of 10,000 to 60,000 from, and content of the low molecular weight components having molecular weight of not more than 5,000 is reduced to not more than 3 weight % of total weight of the binder.

The invention further provides a method for manufacturing a binder for a magnetic recording medium as described above, wherein said ultrafiltration membrane is made of ceramics and has average bore size of 5 to 50 nm.

The invention further provides a method for manufacturing a binder for a magnetic recording medium as described above, wherein, when ultrafiltration is performed using said ultrafiltration membrane, a solvent in the same quantity as the solvent passing through the ultrafiltration membrane from the binder solution is supplemented and the solution is heated to a temperature value by 5° C. lower than the boiling point of a solvent having the lowest boiling point in the solution, and viscosity of the binder solution thus obtained is not greater than 40 centipoises.

Also, the invention provides a method for manufacturing a binder for a magnetic recording medium, whereby said binder is selected from at least one type of polar groups of —SO$_3$M, —PO(OM)$_3$, —COOM (where M represents a hydrogen atom, an alkali metal or an ammonium salt) or amino group, and the content of the polar group is within the range of $1 \times 10^{-5}$ to $60 \times 10^{-5}$ eq/g.

The present invention also provides a magnetic recording medium, comprising a magnetic layer containing at least ferromagnetic powder and a binder, said magnetic layer being placed on a non-magnetic support member, whereby said binder has weight average molecular weight within the range of 10,000 to 60,000, and content of low molecular weight components having molecular weight of not more than 5,000 is reduced to not more than 3 weight % of total weight of the binder by the use of an ultrafiltration membrane.

Further, the present invention provides a magnetic recording medium, comprising at least two layers or more, i.e. a lower coating layer, which contains at least one of magnetic powder or non-magnetic powder, and is placed on a non-magnetic support member, and a magnetic layer containing ferromagnetic powder and a binder being placed on said lower coating layer, whereby at least the binder in the lower coating layer or the magnetic layer has weight average molecular weight within the range of 10,000 to 60,000, low molecular weight components are removed using an ultrafiltration membrane, and content of the low molecular weight components having molecular weight of not more than 5,000 is reduced to not more than 3 weight % of total weight of the binder.

DESCRIPTION OF THE PREFERRED EMBODIMENTS

In the past, as the binder for magnetic recording medium, vinyl chloride resin, polyurethane resin, etc. having good dynamic strength and high solubility in solvent have been used together with polyisocyanate compound.

Further, as the means to increase dispersion property of the ferromagnetic powder used in the magnetic layer to have higher recording density and of the non-magnetic powder used in the lower coating layer, it has been proposed to introduce a polar group such as —COOM, —PO(OM)$_3$, —SO$_3$M, (where M represents a hydrogen atom, an alkali metal or an ammonium salt), amino group, etc. into molecules of the binder such as vinyl chloride resin, polyurethane resin, etc. as described above. However, these polar groups are often strongly adsorbed on the magnetic powder or the non-magnetic powder, react with the polyisocyanate used and not cross-linked or fixed, and a part of them remains in the magnetic coating film and migrates and bleeds out to and slides on the surface of the magnetic layer during the storage at high temperature and high humidity as time elapses and causes contamination of the magnetic head or the running system during running.

The bleeding as described above occurs depending upon the thickness of the magnetic layer, while it is also observed not only in case of a single magnetic layer but also in the magnetic recording medium, which comprises two layers or more using non-magnetic powder and magnetic powder in the lower layer and having very this upper magnetic layer. Also, it has been found that the bleeding occurs in proportion to the content of lower molecular components having molecular weight of not more than 5,000 in the binder resin used. In particular, low molecular weight components of the binder resin not adsorbed to magnetic powder and non-magnetic powder tend to decrease dispersion property and often bleed out to the surface of the magnetic layer during storage, in particular during storage at high temperature and high humidity and cause contamination of the magnetic head.

The present inventors have taken special notice of type and quantity of the polar groups of the binder to form the magnetic layer and non-magnetic layer on the non-magnetic support member and also of the mode of distribution of the polar groups into the molecules of the binder and have been fervently studying a method for manufacturing a magnetic recording medium, which is at high level in electromagnetic transfer characteristics such as dispersion property, running property, durability, storage property, etc. and the properties suitable for practical applications.

As a result, it has been found that it is possible to reduce the quantity of low molecular weight components in the binder resin by adding a poor solvent having lower solubility to dissolve the binder resin in the solution of the binder resin and by precipitating and separating it.

In particular, when a solvent has a solubility parameter different from solubility parameter of the binder resin by more than 1.3 and less than 2.3 and contains no active hydrogen, and further a difference between solubility parameter of the solvent in the solution after mixing and solubility parameter of the binder resin is more than 1.0 and less than 2.0, and this poor solvent is added to the solution where the binder resin having a weight average molecular weight within the range of 10,000 to 60,000 is dissolved. Then, it is possible to reduce the low molecular weight components having a molecular weight of not more than 5,000 to not more than 3 weight % of total weight of the binder resin.

By the use of the binder thus obtained, it is possible to manufacture a magnetic recording medium, which comprises a magnetic layer containing ferromagnetic powder and a binder, and a magnetic recording medium, which comprises at least two layers or more, i.e. a lower coating layer containing at least non-magnetic powder and a binder or a magnetic material and a binder, and an upper magnetic layer containing at least ferromagnetic powder and a binder being placed on said lower coating layer, and said magnetic recording medium has not only good dispersion property and high electromagnetic transfer characteristics but also high running durability and good storage property.

The poor solvent used for fractional precipitation of the binder resin is properly selected according to the type of binder resin. In case a poor solvent containing active hydrogen such as alcohol is used as the poor solvent, and if the solvent is not completely removed from the fractionated binder resin, the solvent remaining in the binder resin may react with an isocyanate curing agent used for the adjustment of the magnetic coating material and may deteriorate smoothness of the coating film or may extremely decrease the durability.

Further, the present inventors have elaborately studied a combination preferable for the poor solvent and found that it is preferable that solubility parameter of the poor solvent to be used for fractional precipitation is 1.3 cal$^{1/2}$ cm$^{-3/2}$ more than and 2.3 cal$^{1/2}$ cm$^{-3/2}$ less than the solubility parameter of the binder resin. Also, in case the difference between solubility parameter of the poor solvent to be used for fractional precipitation and solubility parameter of the binder resin is not more than 1.3 cal½ cm 3/2, phase separation does not occur, or large quantity of the poor solvent or a large size equipment is required to have phase separation.

In case the difference between solubility parameter of the poor solvent used for fractional precipitation and solubility parameter of the binder resin is more than 2.3 cal$^{1/2}$ cm$^{3/2}$, the quantity of the poor solvent necessary for phase separation may be reduced, but solubility of the mixture is rapidly decreased during addition. In case the difference of solubility parameter after mixing and solubility parameter of the binder is more than 1.0 cal$^{1/2}$ cm$^{3/2}$ and less than 2.0 cal½ cm$^{3/2}$, solubility is too low, and it is difficult to remove low molecular weight components of the binder resin.

Further, it is preferable that solubility parameter of the poor solvent used for fractional precipitation is higher than solubility parameter of the binder resin. More concretely, acetonitrile, or a solvent containing acetonitrile or a mixture solvent of toluene and hexane may be used. In particular, it is preferable to use acetonitrile or a mixture solvent at least containing acetonitrile.

The present inventors have also found that it is possible to decrease the content of the low molecular weight components in the binder resin by adding a poor solvent having lower solubility of the binder resin and by separating the solution to a phase where the binder resin is dissolved more and a phase where the low molecular weight components are dissolved more.

In particular, compared with the method to perform precipitation fractionation of the binder resin by adding the poor solvent to the solution of the binder resin, the method of the present invention requires smaller quantity of the poor solvent, i.e. by 0.5 to 3 times as much as that of the binder resin solution when the low molecular weight components are removed. Therefore, the method of the present invention does not require large quantity of the solvent, and smaller quantity of the solvent would suffice to obtain high productivity. The manufacturing cost is reduced and no environmental problem occurs.

In case of precipitation fractionation, solidified resin is picked up and dried, while the method of the present invention does not require pick-up and drying processing in solution state and can be directly used for the manufacture of the magnetic recording medium.

By the use of the binder thus obtained, it is possible to manufacture a magnetic recording medium comprising a magnetic layer having ferromagnetic powder and a binder, and also a magnetic recording medium comprising two layers or more, i.e. a lower coating layer containing at least non-magnetic powder and a binder or a magnetic material and a binder and, an upper magnetic layer containing at least ferromagnetic powder and a binder, being placed on the lower coating layer. The magnetic recording medium thus manufactured has high dispersion property and electromagnetic transfer characteristics and excellent running durability and storage property.

The poor solvent used for phase separation of the binder resin can be properly selected according to the type of the binder resin. In case a poor solvent containing active hydrogen such as alcohol is used as the poor solvent, and if it is not completely removed from the fractionated binder resin, the poor solvent remaining in the binder resin react with isocyanate curing agent used for the adjustment of the magnetic coating material, and this impairs smoothness of the coating film or extremely deteriorates durability.

As the poor solvent, it is most preferable to use acetonitrile. In addition, a mixture solvent such as acetonitrile and cyclohexanone, acetonitrile and methylethylketone, or acetonitrile and toluene may be used.

Further, the present invention provides a method for manufacturing a binder for magnetic recording medium, whereby low molecular weight components are removed using an ultrafiltration membrane from a binder having weight average molecular weight within the range of 10,000 to 60,000 and content of the lower molecular weight components having molecular weight of not more than 5,000 is reduced to not more than 3 weight % of total weight of the binder.

Also, the present invention provides a method for manufacturing a binder for the magnetic recording medium as described above, wherein the ultrafiltration membrane is made of ceramics and having average bore size of 5 to 50 nm.

Also, the present invention provides a method for manufacturing a binder for the magnetic recording medium as described above, wherein, in case ultrafiltration is performed using an ultrafiltration membrane, a solvent in the same quantity as the quantity of the solvent passing through the ultrafiltration membrane from the binder solution is supplemented, and the solution is heated to a temperature value by 50° C. lower than the boiling point of the solvent having the lowest boiling point in the solution, and viscosity of the binder solution thus obtained is not higher than 40 centipoises.

As the binder resin to be used in the present invention, it is preferable that a polar group in the binder resin is —$SO_3M$ (where M represents a hydrogen atom, an alkali metal or an ammonium salt), and the content of polar group is within the range of $1 \times 10^{-5}$ to $60 \times 10^{-5}$ eq/g—binder, and, more preferably within the range of $2 \times 10^{-5}$ to $30 \times 10^{-5}$ eq/g—binder.

As the resin to be used in the method for manufacturing a binder for a magnetic recording medium of the present invention, the following resins may be used: polyester polyurethane resin, polyether polyurethane resin, polyetherester polyurethane resin, polyurethane resin, vinyl chloride resin, vinyl chloride vinyl acetate resin, etc.

Glass transition temperature is preferably between −30° C. and 200° C., or more preferably between 0° C. and 120° C. If it is lower than −30° C., coating film strength at high temperature is decreased, and durability and storage property are lowered. If it is higher than 200° C., calender workability decreases, leading to poor electromagnetic transfer characteristics.

In particular, in case of polyurethane having the binder resin of high hardness and having magnetic layer with high properties, it is preferable that it is polyurethane resin, obtained as reaction product using diol and organic diisocyanate as main materials, and it contains diol having cyclic structure and/or short-chain diol, which is obtained by adding alkylene oxide to diol. The content of short-chain diol in the polyurethane resin is preferably 15 to 50 weight %, or more preferably 20 to 40 weight %. If it is less than 15 weight %, the coating film obtained is too soft and sufficient strength cannot be attained, thus leading to lower durability. If it is more than 50 weight % solubility in solvent decreases and dispersion property of ferromagnetic powder is likely to decrease. As a result, electromagnetic transfer characteristics tend to decrease, and coating film becomes fragile, and durability also decreases.

The short-chain diol having cyclic structure has preferably molecular weight of 200 to 1,000, or more preferably 300 to 700. If it is lower than 200, the magnetic layer becomes fragile and durability decreases. If it is more than 1,000, glass transition temperature (Tg) of the magnetic layer decreases, and it becomes too soft, and durability decreases.

As the long-chain diol, it is preferable to use bisphenol A, hydrogenated bisphenol A, bisphenol S, bisphenol P, and polyethylene oxide addition product, polypropylene oxide addition product, or polyethylene polypropylene mixed addition product of these compounds. More preferably, hydrogenated bisphenol A and polyethylene oxide or propylene oxide addition product of these compound may be used.

Weight average molecular weight (Mw) of the long-chain diol is preferably 1,000 to 5,000. If it is higher than 5,000, glass transition temperature decreases, and it becomes too soft, leading to poor durability.

OH content in the polyurethane is preferably 2 to 20 per molecule, or more preferably 3 to 15 per molecule.

If OH content is less than 2 per molecule, reactivity with isocyanate curing agent decreases. As a result, coating film strength is reduced, and durability decreases. If it is more than 20 per molecule, solubility in the solvent decreases, leading to lower dispersion property.

As a compound to be used for the adjustment of the content of OH groups in the polyurethane resin, a compound having 3 or more functional OH groups may be used. More concretely, trimethylol ethane, trimethylol propane, trimellitic acid anhydride, glycerine, pentaerythritol, hexane triol, etc. may be used. For example, branched polyester, or polyetherester having 3 or more functional OH groups may be used, which is obtained as glycol component, using dibasic acid and the above compounds as used as the raw material polyester polyol as described in JP-B-G-64726. More preferably, 3 functional group is used. If it is 4 functional group or more, it is more likely to be gelatinized in the reaction process.

In particular, the polyurethane resin has preferably glass transition temperature of 40° C. to 200° C., more preferably 50° C. to 170° C., or most preferably 60° C. to 130° C. If it is lower than 40° C., coating film strength at high temperature decreases, resulting in lower durability and poor storage property. If it is higher than 200° C., calender workability decreases, and electromagnetic transfer characteristics are reduced.

Synthetic resin of vinyl chloride type may be simultaneously used with the polyurethane resin. As the vinyl chloride resin used for this purpose, it is preferable to use the resin with its low molecular weight components reduced by precipitation fractionation just as the case of polyurethane resin. Polymerization degree of the vinyl chloride resin for this purpose is preferably 200 to 600, or more preferably 250 to 450. As the vinyl chloride resin, the product obtained by copolymerization of vinyl acetate, vinyl alcohol, vinylidene chloride, acrylonitrile, etc. may be used. Or, cellulose derivatives such as nitrocellulose resin, or acrylic resin, polyvinyl acetal resin, polyvinyl butyral resin, epoxy resin, phenoxy resin, etc. may be simultaneously used. These can be used alone or in combination.

The binder resin is used in the binder preferably by 15 to 40 weight %, or more preferably by 20 to 30 weight %. If it is lower than 15 weight %, dispersion property decreases.

In case the other synthetic resin is simultaneously used, the content of the polyurethane resin in the magnetic layer is preferably 10 to 100 weight %, in the binder or more preferably, 20 to 100 weight %, or most preferably, 50 to 100 weight %. If it is contained by less than 10 weight %, solubility in the solvent decreases, thus leading to poor dispersion property.

In case vinyl chloride resin is used as the other synthetic resin, it is contained in the binder preferably by 10 to 80 weight %, or more preferably by 20 to 70 weight %, or most preferably by 30 to 60 weight %.

With the short-chain diol of the present invention, the other diol may be simultaneously used. More concretely, the following diols may be used: aliphatic diols such as ethylene glycol, 1,3-propylene diol, 1,2-propylene glycol, 1,4-butanediol, 1,5-pentane diol, 1,6-hexane diol, 2,2-dimethylpropane diol, 1,8-octane diol, 1,9-nonane diol, diethylene glycol, cyclohexane-1,4-diol, cylohexane-1,4-dimethanol, cycloaliphatic diol, or ethylene oxide or propylene oxide addition product of N-diethanolamine.

By the use of these compounds, it is possible to obtain coating film having cyclic structure, and having high strength and high Tg value and high durability.

As the vinyl chloride resin, vinyl chloride is used as main monomer, and copolymer of the following compounds is used: vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinylbutyral, vinyl acetal, vinylether, vinyl sulfonate, acrylamide, hydroxyethyl acrylate, glycidyl acrylate, etc.

Vinyl chloride unit is preferably contained by 57 to 98 weight %. If it is contained by less than 57 weight %, strength of the coating film of the resin obtained is lowered. If it is higher than 98 weight %, solubility of ketones, esters, etc. in the resin in the organic solvent is impaired. Vinyl alcohol unit is contained preferably by 2 to 16 weight %. If it is less than 2 weight %, it is not possible to have good effects on solubility of ketones, esters, etc. in organic solvent when preparing the coating material, i.e. it is not possible to have good dispersion property of magnetic powder and non-magnetic powder, good reactivity with isocyanate compound to be used with the resin, and good compatibility with the other resin. If it is contained by more than 16 weight %, viscosity of the coating material becomes too high, and pot life is shortened when isocyanate compound is added, and it is not suitable for practical application. The other vinyl unit is preferably contained by 0 to 26 weight %.

If this range is exceeded, dynamic physical property and dispersion property of the entire resin are decreased. It is possible to turn vinyl acetate, vinyl propionate, etc. to vinyl alcohol components by saponifying vinyl chloride copolymer thus obtained.

To introduce the polar group, polar group may be added or synthesized by reaction to vinyl chloride resin, which does not contain polar group.

For example, in case the group —$SO_3M$ is introduced into vinyl chloride resin, vinyl chloride monomer and a copolymerizable compound having glycidyl group, and when necessary, the other compound copolymerizable with these are copolymerized at first. At the same time as the copolymerization or after copolymer has been obtained, reaction with the compound having —$SO_3M$ is performed. As the copolymerizable compound to introduce glycidyl group, glycidyl acrylate, glycidyl methacrylate, glycidyl vinyl ether, etc. may be used. These may be used alone or in combination.

The methods to manufacture these compounds are already known in the art. For example, reference should be made to: "Experimental Methods to Synthesize High Molecular Compounds" (Takayuki Ohtsu; published by Kagaku Dojin Co., Ltd., 1972). These methods can be utilized in the present invention.

It is also possible to obtain the copolymerizable compound containing polar group by copolymerization with vinyl chloride monomer or other copolymerizable compound. More concretely, the compound obtained by introducing polar group into copolymer of the following compound may be used: vinyl acetate, vinyl alcohol, maleic acid, acrylic acid ester, vinylidene chloride, acrylonitrile, methacrylic acid, methacrylic acid ester, styrene, butadiene, ethylene, vinylbutyral, vinylacetal, vinylether, vinyl sulfonate, acrylamide, hydroxyethyl acrylate, glycidyl acrylate, etc.

For example, as the copolymerizable compound to introduce —$SO_3M$, the following compounds may be used: unsaturated hydrocarbon sulfonate such as 2-acrylamide-2-methylpropane sulfonate, vinyl sulfonate, acryl sulfonate, methacryl sulfonate, p-styrene sulfonate, etc. and salt of these compounds, sulfoalkyl esters of acrylic acid or methacrylic acid such as methacrylic acid sulfoethyl ester, methacrylic acid sulfopropyl ester, etc. and salt of these compounds. These compounds may be used alone or in combination. Two types or more or polar groups may be introduced. For example, in case it is necessary to introduce —$COOM$ in addition to —$SO_3M$ as described above, copolymerizable compound containing —$COOM$, more concretely, acrylic acid, methacrylic acid, maleic acid, etc. or salt of these compounds may be used.

Average polymerization degree of the vinyl chloride resin is preferably 200 to 800, or more preferably 250 to 700. If it is less than 200, the magnetic coating film obtained becomes too fragile and physical strength is decreased, and this also adversely affects durability of magnetic tape and the like. If it exceeds 800, viscosity of the coating material at a predetermined concentration is increased. This extremely impairs working efficiency and causes difficulty in handling.

As a polymerization initiator to be used in the manufacture of polymer, the following compounds may be used: organic peroxides such as lauroyl peroxide, benzoyl peroxide, 3,5,5-trimethyl-hexanoyl peroxide, diisopropyl peroxy dicarbonate, di-2-thyelhexyl peroxy dicarbonate, di-2-ethyloxyethyl peroxy dicarbonate, t-butyl-peroxy pivalate, t-butyl-peroxy neodecanoate, etc., azo compounds such as 2,2'-azobisisobutylonitrile, 2,2'-azobis-2,4-dimethylvaleronitrile, 4,4'-azobis-4-cyanovalerate, etc., and inorganic peroxides such as ammonium persulfate, potassium persulfate, ammonium perphosphate, etc. Also, redox initiators, i.e. products obtained by combination of peroxides such as hydrogen peroxide, cumene hydroperoxide, t-butyl hydroperoxide, etc. with a reducing agent such as formaldehyde sodium sulfoxylate, sodium sulfite, sodium thiosulfate, ascorbic acid, etc. may be used.

As suspension stabilizers, the following compounds may be used: polyvinyl alcohol, partial saponified product of polyvinyl acetate, cellulose derivatives such as methyl cellulose, hydroxypropyl cellulose, carboxymethyl cellulose, etc., macromolecular compounds such as polyvinyl pyrolidone, polyacrylamide, maleic acid—styrene copolymer, maleic acid—methylvinylether copolymer, maleic acid—Vinyl acetate copolymer, etc. and natural macromolecular substances such as starch, gelatin.

As emulsifiers, anionic emulsifiers such as alkylbenzene sodium sulfonate, lauryl sodium sulfate, etc., non-ionic emulsifiers such as polyoxyethylene alkylether, polyoxyethylene sorbitan fatty acid partial ester, etc. may be used. Also, molecular weight modifiers such as trichlorethylene, thioglycol, etc. may be used.

The binder of the present invention may contain organic isocyanate. As the organic diisocyanate compounds, the following substances may be used: aromatic diisocyanate such as 2,4-tolylene diisocyanate, 2,6-tolylene diisocyanate, xylen-1,4-diisocyanate, xylene-1,3-diisocyanate, 4-4'-diphenylmethane diisocyanate, 4-4-diphenylether diisocyanate, 2-nitrodiphenyl-4,4'-diisocyanate, 2-2'-dephenylpropane-4-4'-diisocynate, 4-4'-diphenylpropane diisocyanate, m-phenylene diisocyanate, p-phenylene diisocyanate, naphthylene-1,4-diisocyanate, naphthylene-1, 5-diisocyanate, 3,31-dimethoxydiphenyl-4,4'-diisocyanate, etc., aliphatic diisocyanate, such as lysine diisocyanate, cycloaliphatic diisocyanates such as isophorone diisocyanate, hydrogenated tolylene diisocyanate, hydrogenated diphenylmethane diusocyanate, etc.

The polyisocyanate compound in the binder is contained in the binder preferably within the range of 10 to 50 weight %, or more preferably within the range of 20 to 40 weight %.

In case curing is performed by electron beam irradiation, a compound having reactive dual bond such as urethane acrylate may be used.

Total weight of resin components and curing agent (i.e. total weight of the binder) is preferably within the range of 15 to 40 weight parts to 100 weight parts of the ferromagnetic powder, or more preferably within the range of 20 to 30 weight parts.

As the ferromagnetic powder used in the magnetic recording medium of the present invention, ferromagnetic iron oxide, cobalt-containing ferromagnetic iron oxide or ferromagnetic alloy powder having $S_{BET}$ specific surface area of 40 to 80 $m^2/g$, or more preferably 50 to 70 $m^2/g$ may be used. Crystallite size is 12 to 25 nm, or more preferably 13 to 22 nm, or most preferably 14 to 20 nm. The longer axis is 0.05 to 0.25 $\mu$m in length, or more preferably 0.07 to 0.2 $\mu$m, or most preferably 0.08 to 0.15 $\mu$m. As the ferromagnetic metal powder, Fe, Ni, Fe—Co, Fe—Ni, Co—Ni, Co—Ni—Fe, etc. may be used. An alloy containing the following element within the range of not more than 20 weight % of the metal component may be used: aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, or bismuth. Also, the ferromagnetic metal powder may contain small quantity of water, hydroxide or oxide. The method to manufacture the ferromagnetic powder is already known in the art, and the ferromagnetic powder used in the present invention may be manufactured by the method already known.

There is no special restriction on shape of the ferromagnetic powder. Normally, the powder in needle-like shape, granular shape, cubic shape, grain-like shape or planar shape may be used. In particular, it is preferable to use ferromagnetic powder in needle-like shape.

The resin component, the curing agent and the ferromagnetic powder as described above are mixed, kneaded and dispersed with a solvent such as methylethylketone, dioxane, cyclohexanone, ethyl acetate, etc. used in the preparation of coating solution of the magnetic layer, and magnetic coating material is prepared. Kneading and dispersion may be performed according to normal method.

The magnetic recording medium according to the present invention may comprise a non-magnetic lower coating layer containing a binder having polyurethane resin used for the magnetic layer and non-magnetic powder or magnetic powder, and magnetic lower coating layer placed on a non-magnetic support member. The non-magnetic powder can be selected from inorganic compounds such as metal oxide, metal carbonate, metal sulfate, metal nitride, metal carbide, metal sulfide, etc. As the inorganic compound, the following compounds may be used alone or in combination: α-alumina with alpha ratio of 90 to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium oxide, calcium sulfate, barium sulfate, molybdenum disulfide, etc. Titanium dioxide, zinc oxide, iron oxide, or barium sulfate may be preferably used, or more preferably, titanium dioxide may be used. Average particle size of the non-magnetic powder is preferably 0.005 to 2 $\mu$m. When necessary, non-magnetic powder having different average particle sizes may be combined, or single type non-magnetic powder may provide the same effect by widening particle size distribution. Above all, it is preferable to use non-magnetic powder having average particle size of 0.01 to 0.2 $\mu$m. Non-magnetic powder has preferably pH value between 6 and 9. Specific surface area of non-magnetic powder is preferably 1 to 100 $m^2/g$, or more preferably 5 to 50 $m^2/g$, or most preferably 7 to 40 $m^2/g$. Crystallite size of the non-magnetic powder is preferably 0.01 to 2 $\mu$m. Oil absorption using DBP is preferably 5 to 100 ml/100 g, or more preferably 10 to 80 ml/100 g, or most preferably 20 to 60 ml/100 g. Specific gravity is preferably 1 to 12, or more preferably 3 to 6. Shape may be any of needle-like shape, spherical shape, polygonal shape or planar shape.

It is preferable that the surface of the non-magnetic powder is processed by surface treatment with $Al_2O_3$, $SiO_2$, $TiO_2$, $ZrO_2$, $SnO_2$, $Sb_2O_3$, or ZrO. In particular, it is preferable to use $Al_2O_3$, $SiO_2$, $TiO_2$, or more preferably, $Al_2O_3$, $SiO_2$ or $ZrO_2$. These may be used alone or in combination.

Coprecipitated surface treatment layer may be used depending upon the purpose, or a method to treat the surface layer with silica after processing with alumina or a method by reversing this procedure may be adopted. The surface treatment layer may be made porous depending upon the purpose. However, it is preferably homogeneous and dense.

As the magnetic powder to be used in the lower coating layer, $\gamma$-$Fe_2O_3$, Co-modified $\gamma$-$Fe_2O_3$, alloy containing $\alpha$-Fe as major component, $CrO_2$, etc. may be used. In particular, it is preferable to use Co-modified $\gamma$-$Fe_2O_3$. The ferromagnetic powder used in the lower layer of the present invention may preferably have the same composition and performance characteristics as the ferromagnetic powder used in the upper magnetic layer. However, performance characteristics should be varied according to the purpose. For example, to improve long wavelength recording property, it is desirable to set Hc of the lower magnetic layer at a value lower than that of the upper magnetic layer. Also, it is effective to set Br of the lower magnetic layer to a value higher than that of the upper magnetic layer. In addition, it is possible to add advantages by adopting multiple layer structure as already known in the art.

As the other additives to be used in the magnetic layer or the lower coating layer of the present invention, compounds having lubricating effect, antistatic effect, dispersion effect, plasticizing effect, etc. may be used. These compounds are as follows: molybdenum disulfide, tungsten disulfide, graphite, boron nitride, graphite fluoride, silicone oil, silicone having polar group, fatty acid modified silicone, fluorine-containing silicone, fluorine-containing alcohol, fluorine-containing ester, polyolefin, polyglycol, alkyl phosphoric acid ester and its alkali metal salt, alkyl sulfuric acid ester and its alkali metal salt, polyphenyl ether, fluorine-containing alkyl sulfuric acid ester and its alkali metal salt, mono-basic fatty acid either containing unsaturated bond having 10 to 24 carbon atoms or branched and its metal salt (such as Li, Na, K, Cu, etc.), or mono-hydric, di-hydric, tri-hydric, tetra-hydric, penta-hydric, or hexa-hydric alcohol containing unsaturated bond having 12 to 22 carbon atoms or branched, alkoxy alcohol either containing unsaturated bond having 12 to 22 carbon atoms or branched, mono-fatty acid ester or di-fatty acid ester or tri-fatty acid ester, comprising one of mono-basic fatty acid either containing unsaturated bond having 2 to 12 carbon atoms or branched, or mono-hydric di-hydric, tri-hydric, tetra-hydric, penta-hydric, or hexa-hydric alcohol either containing unsaturated bond having 2 to 12 carbon atoms or branched, fatty acid ester of mono-alkyl ether of alkylene oxide polymerization product, fatty acid amide having 2 to 22 carbon atoms, or aliphatic amine having 8 to 22 carbon atoms may be used. Concrete examples of these compounds include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Also, nonionic surface active agents such as alkylene oxide type, glycerine type, glycidol type, alkylphenol-ethylene oxide addition product, cationic surface active agents such as cyclic amine, ester amide, quaternary ammonium salts, hydantoin derivatives, heterocyclic compounds, phosphonium or sulphonium, etc., anionic surface active agents containing acidic group such as carboxylic acid, sulfonic acid, phosphoric acid, sulfuric acid ester group, phosphoric acid ester group, etc. and amphoteric surface active agents such as amino acids, amino-sulfonic acids, sulfuric acid or phosphoric acid esters of aminoalcohol, alkyl bedain type, etc. may be used. Detailed information on these surface active agents are described in "Handbook for Surface Active Agents" (published by Sangyo Tosho Co., Ltd.). These lubricants, antistatic agents, etc. may not necessarily be pure and may contain impurities such as isomer, unreacted product, side reaction product, decomposed product, oxide, etc. in addition to main component. These impurities are contained preferably by not more than 30 weight %, or more preferably by not more than 10 weight %.

Type and quantity of these lubricants and surface active agents used in the present invention may be varied for the non-magnetic layer and the magnetic layer as necessary. For example, these may be used in the following manner: to use fatty acids with different melting points according to whether it is non-magnetic layer or magnetic layer and to control bleeding to the surface, to use esters having different boiling points and polarities and to control bleeding to the surface, to adjust the quantity of surface active agent and to improve coating stability, or to increase the adding quantity of lubricant for non-magnetic layer to improve lubricating effect, etc. The modes of the use are not limited to the above. Also, all or a part of the additives to be used in the present invention may be added in any of the processes during manufacture of the coating solution for magnetic layer or for lower layer. For example, it may be mixed with ferromagnetic power prior to the kneading process, it may be added in the kneading process of ferromagnetic powder, binder and solvent, or it may be added in the dispersion process, or may be added after dispersion, or it may be added immediately before coating.

As these lubricants to be used in the present invention, the following compounds may be used: NAA-102, castor oil cured fatty acid, NAA-42, Cation SA, Nymeen L-201, Nonion E-208, Anon BF, Anon LG, butyl stearate, butyl laurate, erucic acid (manufactured by Nippon Fat and Oil Co., Ltd.), oleic acid (manufactured by Kanto Chemical Co., Ltd.), FAL-205 and FAL-123 (manufactured by Takemoto Fat and Oil Co., Ltd.), Enujerb OL (manufactured by Shin-nippon Rika Co., Ltd.), TA-3 (manufactured by Shin-Etsu Chemical Co., Ltd.) Armide P (manufactured by Lion-Armor Co., Ltd.), Duomin TDO (manufactured by Lion Corporation), BA-41G (manufactured by Nisshin Oil Co., Ltd.), Profan 2012E New Pole PE61, and Ionet MS-440 (manufactured by Sanyo Kasei Co., Ltd.)

The coating solution prepared from the above compounds is coated on the non-magnetic support member to form a lower coating layer or a magnetic layer.

As the non-magnetic support member to be used in the present invention, polyethylene naphthalate, polyethylene terephthalate, polyamide, polyimide, polyamideimide, aromatic polyamide, polybenz oxydazole, etc. produced by biaxial stretching may be used. More preferably, polyethylene naphthalate and aromatic polyamide may be used. These non-magnetic support members may be processed in advance by corona discharge, plasma processing, adhesive processing, heat treatment, etc. It is preferable that the non-magnetic support member used in the present invention has such smooth surface that average surface roughness at center line is 0.1 to 20 nm with cut-off value of 0.25 mm, or within the range of 1 to 10 nm. Also, it is preferable that the non-magnetic support member has not only small value of average surface roughness at center line but also has no coarse protrusion of $1\mu$ or more.

To manufacture the magnetic recording medium of the present invention, coating solution for the magnetic layer is coated on the surface of the non-magnetic support member under running condition preferably to have layer thickness after drying of the magnetic layer within the range of 0.05 to 5 $\mu$m, or more preferably within the range of 0.07 to 1 $\mu$m. Two or more types of coating solution for the magnetic layer may be sequentially or simultaneously coated, or the coating solution for the lower layer and the coating solution for the magnetic layer may be coated sequentially or at the same time.

As the coating device for coating the above magnetic coating solution or the lower layer coating solution, the following coating devices may be used: air doctor coat, blade coat, rod coat, extrusion coat, air knife coat, squeeze coat, impregnation coat, reverse roll coat, transfer roll coat, gravure coat, kiss coat, cast coat, spray coat, spin coat, etc. For these devices, reference may be made, for example, to: "The Newest Coating Technique" (published by Sogo Gijutsu Center, Ltd.; May 31, 1983).

In case the product of the present invention is to be applied for a magnetic recording medium having two layers or more, the following coating devices and methods are proposed:

(1) Using the coating device such as gravure, roll, blade, extrusion, etc. generally used in the coating of the coating solution for magnetic layer, the lower layer is coated at first, and while the lower layer is not yet dried, the upper layer is coated using a support member pressurizing type extrusion coating device as disclosed in JP-B-89046186, JP-A-60238179 (U.S. Pat. No. 4,681,062), JP-A-02265672 (U.S. Pat. No. 5,302,206), etc.

(2) The upper layer and the lower layer are coated almost at the same time using a coating head having two coating solution passing slits as disclosed in JP-A-6388080, JP-A-02017971, or JP-A-02265672.

(3) The upper layer and the lower layer are coated almost at the same time using an extrusion coating device with backup roll as disclosed in JP-A-02174965.

On the surface not coated with magnetic coating material of the non-magnetic support member of the present invention, a back-coat layer (backing layer) may be provided. The back-coat layer is a layer where a coating material for the back-coat layer, produced by dispersing granular component such as adhesive material, antistatic agent, etc. and a binder in an organic solvent, is coated on the surface not coated with magnetic coating material of the non-magnetic support member. As the granular components, various types of inorganic pigment or carbon black may be used. As the binder, resin such as nitrocellulose, phenoxy resin, vinyl chloride resin, polyurethane, etc. may be used alone or in combination.

The polyurethane resin of the present invention may be used as the polyurethane resin for the back-coat layer to improve the durability.

An adhesive agent layer may be provided on the coating surface of the magnetic coating material for the non-magnetic support member or the coating material for forming the back-coat layer. The coating layer of the coating solution for the magnetic layer is dried after providing magnetic field orientation processing for the ferromagnetic power contained in the coating layer of the coating solution for the magnetic layer.

After drying as described above, surface smoothening is performed on the coating layer. For the surface smoothening processing, a super-calender roll is utilized, for example. By performing the surface smoothening processing, bores produced by removal of solvent during drying are eliminated, and filling ratio of the ferromagnetic power in the magnetic layer is increased, and this makes it possible to obtain a magnetic recording medium having high electromagnetic transfer characteristics.

As the calender processing roll, heat-resistant plastic roll made of epoxy resin, polyimide, polyamide, polyamide-imide, etc. is used, or a metal roll may be used.

It is preferable that the magnetic recording medium of the present invention has very smooth surface, having average surface roughness at center line preferably within the range of 0.1 to 5 nm or more preferably within the range of 1 to 4 nm with the cut-off value of 0.25 mm.

For this purpose, the magnetic layer formed by selecting a specific type of ferromagnetic powder and the binder as described above is treated by the above calender processing. The conditions for calender processing are: temperature of calender roll within the range of 60 to 100° C., or more preferably within the range of 70 to 100° C., or more preferably within the range of 80 to 100° C.; pressure within the range of 100 to 500 kg/cm, or more preferably within the range of 200 to 450 kg/cm, or most preferably within the range of 300 to 400 kg/cm.

The magnetic recording medium thus prepared may be cut into any size as desired using a cutter.

EMBODIMENTS

Description will be given now on embodiments of the present invention to explain further details of the present invention. In the following, the term "part(s)" means "weight part(s)", and the symbol "%" means "weight %".

(Manufacture example of polyurethane resin "a")

This is a resin solution, which comprises hydrogenated bisphenol A, polypropylene glycol (weight average molecular weight: 2,000) neopentyl glycol, ethylene glycol addition product of sodium sulfoisophthalate, and MDI (4,4-diphenylmethane diisocyanate) in the ratio of 25:5:19:1:50 (mol %) (Weight average molecular weight 35,000; content of lower molecular components having molecular weight of not more than 5,000: 5.5 weight %—binder; content of polar groups: $6 \times 10^{-5}$ eq/g—binder; solubility parameter 10.1; solid matters: 30 weight %; solvent composition: cyclohexanone-dimethyl acetamide (mixing ratio 1.4:1).

(Manufacture example of polyurethane resin 1B)

To 100 parts of the polyurethane resin "a", 50 parts of acetonitrile were added. Solubility parameter after adding the poor solvent was 11.0, and phase separation did not occur.

(Manufacture example of polyurethane resin 1C)

To 100 parts of the solution of the polyurethane resin "a" (weight average molecular weight 35,000; content of low molecular weight components having molecular weight of not more than 5,000: 5.5 weight %—binder; content of polar groups: $6 \times 10^{-5}$ eq/g—binder; solubility parameter 10.1; solid matters: 30 weight %; solvent composition: cyclohexanone and dimethyl acetamide (mixing ratio 1.4:1), 100 parts of acetonitrile (solubility parameter: 11.9) were added bit by bit to have phase separation.

In this case, solubility parameter of the mixed product after adding the poor solvent was 11.2, and the lower layer was the resin dense phase. After leaving this to stand for 24 hours, thin (dilute) phase in the upper layer was removed, and cyclohexanone was added and dissolved again to have the solid matters at 30% level.

In the polyurethane resin 1C thus prepared, weight average molecular weight was 36,000, content of low molecular weight components having molecular weigh of not more than 5,000 was 2.0 weight %—binder, and content of polar groups was $6 \times 10^{-5}$ eq/g—binder. Yield ratio of the prepared resin to the raw material resin was 84%.

(Manufacture example of polyurethane resin 1D)

Polyurethane resin 1D was prepared by the same procedure as the manufacturing example of the polyurethane resin 1C except that the quantity of acetonitrile used was set to 200 parts. In this case, solubility parameter of the mixture after adding the poor solvent was 11.5, and the lower layer was the resin dense phase. In the polyurethane resin lD thus prepared, weight average molecular weight was 36,000, the content of low molecular weight components having molecular weight of not more than 5,000 was 2.8 weight %—binder, and the content of polar groups was $6 \times 10^{-5}$ eq/g—binder. Yield ratio of the prepared resin to the raw material resin was 90%.

(Manufacture example of polyurethane resin 1E)

Polyurethane resin 1E was prepared by the same procedure as in the manufacture example of the polyurethane resin 1C except that the quantity of acetonitrile was set to 800 parts. In this case, solubility parameter of the mixture after adding the poor solvent was 11.8. The lower layer was the resin dense phase. In the polyurethane resin 1E thus prepared, weight average molecular weight was 36,000, the content of low molecular weight components having molecular weight of not more than 5,000 was 3.0 weight %—binder, and the content of polar groups was $6 \times 10^{-5}$ eq/g—binder. Yield ratio of the prepared resin to the raw material resin was 93%.

(Manufacture example of polyurethane resin 1F)

Polyurethane resin 1F was prepared by the same procedure as in the manufacture example of the polyurethane resin 1C except that 500 parts of toluene (solubility parameter: 8.9) were used instead of acetonitrile. In this case, solubility parameter of the mixture after adding the poor solvent was 9.1, and the lower layer was the resin dense phase. In the polyurethane resin 1F thus prepared, weight average molecular weight was 35,000, the content of low molecular weight components having molecular weight of not more than 5,000 was 4.5 weight %—binder, and the content of polar groups was $6 \times 10^{-5}$ eq/g—binder. Yield ratio of the prepared resin to the raw material resin was 50%.

(Manufacture example of polyurethane resin 1G)

Polyurethane resin 1G was prepared by the same procedure as in the manufacture example of the polyurethane resin 1C except that 100 parts of mixed solvent comprising n-hexane and toluene (in the mixing ratio of 6:4) (Solubility parameter: 7.9) was used instead of acetonitrile. In this case, solubility parameter of the mixture after adding the poor solvent was 8.9, and the lower layer was the resin dense phase. In the polyurethane resin 1G thus prepared, weight average molecular weight was 36,000, the content of low molecular weight components having molecular weight of not more than 5,000 was 2.8 weight %—binder, and the content of polar groups was $6 \times 10^{-5}$ eq/g—binder. Yield ratio of the prepared resin to the raw material resin was 60%.

(Manufacture example of polyurethane resin 1H)

Polyurethane resin 1H was prepared by the same procedure as in the manufacture example of the polyurethane resin 1C except that 500 parts of the mixed solvent comprising n-hexane and toluene (mixing ratio of 6:4) were used. In this case, solubility parameter of the mixture after adding the poor solvent was 8.2, and the lower layer was the resin dense phase. In the polyurethane resin 1G thus prepared, weight average molecular weight was 36,000, the content of low molecular weight components having molecular weight of not more than 5,000 was 3.0 weight %—binder; and the content of polar groups was $6 \times 10^{-5}$ eq/g—binder. Yield ratio of the prepared resin to the raw material resin was 70%.

(Manufacture example of polyurethane resin 1i)

Polyurethane resin 1i was prepared by the same procedure as in the manufacture example of the polyurethane resin 1C except that 600 parts of the mixed solvent comprising n-hexane and toluene (mixing ratio of 7:3) (Solubility parameter: 7.8) were used instead of acetonitrile. In this case, solubility parameter of the mixture after adding the poor solvent was 8.0, and the lower layer was the resin dense phase. In the polyurethane resin 1i thus prepared, weight average molecular weight was 36,000, the content of low molecular weight components having molecular weight of not more than 5,000 was 3.2 weight %—binder, and the content of polar groups was $6 \times 10^{-5}$ eq/g—binder. Yield ratio of the prepared resin to the raw material resin was 75%.

(Manufacture example of polyurethane resin 1j)

Polyurethane resin 1j was prepared by the same procedure as in the manufacture example of the polyurethane resin 1C except that 600 parts of n-hexane (solubility parameter: 7.3) were used instead of acetonitrile. In this case, solubility parameter of the mixture after adding the poor solvent was 7.6, and the lower layer was the resin dense phase. In the polyurethane resin 1j thus prepared, weight average molecular weight was 35,000, the content of low molecular weight components having molecular weight of not more than 5,000 was 5.5 weight %—binder, and the content of polar groups was $6 \times 10^{-5}$ eq/g—binder. Yield ratio of the prepared resin to the raw material resin was 95%.

(Manufacture example of vinyl chloride resin 1K)

This is produced by introducing —$SO_3Na$ group into a copolymer, which comprises vinyl chloride, vinyl acetate, allylglycidyl ether, and 2-hydrixyethyl methacrylate (85:5:5:5) (mol %). In this vinyl chloride resin 1K, weight average molecular weight was 32,000, the content of low molecular weight components having molecular weight of not more than 5,000 was 7.4 weight %—binder, and the content of polar groups was $7 \times 10^{-5}$ eq/g—binder; and solubility parameter was 10.0.

(Manufacture example of vinyl chloride resin 1L)

To 70 parts of mixed solvent comprising cyclohexanone and dimethylacetamide (1.4:1), 30 parts of the solution of the vinyl chloride resin 1K were dissolved, and 100 parts of acetonitrile (solubility parameter: 11.9) were added bit by bit to have phase separation.

In this case, solubility parameter of the mixture after adding the poor solvent was 11.2, and the lower layer was the resin dense phase. After leaving this to stand for 24 hours to remove thin (dilute) layer in the upper layer, cyclohexanone was added and dissolved again to have the solid matters at 30% level.

In the vinyl chloride resin 1L thus prepared, weight average molecular weight was 33,000, the content of low molecular weight components having molecular weight of not more than 5,000 was 2.7 weight %—binder, and the content of polar groups was $7 \times 10^{-5}$ eq/g—binder. Yield ratio of the prepared resin to the raw material resin was 80%.

(Manufacture example of polyurethane resin 1M)

Polyurethane resin 1M was prepared by the same procedure as in the manufacture example of polyurethane resin 1C except that a solution of polyurethane resin not containing polar group was used instead of the solution of the polyurethane resin "a".

In the polyurethane resin 1M thus prepared, weight average molecular weight was 35,000, and the content of low molecular weight components having molecular weight of not more than 5,000 was 2.7 weight %—binder.

(Manufacture example of polyurethane resin 1N)

Polyurethane resin 1N was prepared by the same procedure as in the manufacture example of polyurethane resin 1C using the polyurethane resin "a" except that —$PO(OK)_3$ was contained as the polar group.

In the polyurethane resin 1N thus prepared, weight average molecular weight was 35,000, the content of low molecular weight components having molecular weight of not more than 5,000 was 2.8 weight %—binder, and the content of polar groups was $15 \times 10^{-5}$ eq/g—binder.

(Manufacture example of polyurethane resin 1O)

Polyurethane resin 1O was prepared by the same procedure using the same resin solution as the solution of the polyurethane resin "a" except that —COOH was contained as the polar group.

In the polyurethane resin 1O thus prepared, weight average molecular weight was 37,000, the content of low molecular weight components having molecular weight of not more than 5,000 was 2.6 weight %—binder, and the content of polar groups was $60 \times 10^{-5}$ eq/g—binder.

The binder resins prepared in the above are summarized in Table 1.

TABLE 1

| Binder resin | | Poor solvent | | | SP after adding | Binder resin prepared | | | |
|---|---|---|---|---|---|---|---|---|---|
| | | | | | | | Lower molecular weight | Type and q'ty of polar groups | |
| Type | SP | Type | SP | Adding q'ty (parts) | | Mw (in 10,000) | components (weight %) | Type | $10^{-5}$ eq/g |
| a | 10.1 | Untreated | — | — | — | 3.5 | 5.5 | —SO$_3$Na | 6 |
| 1b | 10.1 | Acetonitrile | 11.9 | 50 | 11.0 | Homogenous system (not precipitated) | | | |
| 1C | 10.1 | Acetonitrile | 11.9 | 100 | 11.2 | 3.7 | 2.0 | —SO$_3$Na | 6 |
| 1D | 10.1 | Acetonitrile | 11.9 | 200 | 11.5 | 3.6 | 2.8 | —SO$_3$Na | 6 |
| 1E | 10.1 | Acetonitrile | 11.9 | 800 | 11.8 | 3.6 | 3.0 | —SO$_3$Na | 6 |
| 1f | 10.1 | Toluene | 8.9 | 500 | 9.1 | 3.5 | 4.5 | —SO$_3$Na | 6 |
| 1G | 10.1 | n-hexane/toluene (6:4) | 7.9 | 100 | 8.9 | 3.6 | 2.8 | —SO$_3$Na | 6 |
| 1H | 10.1 | n-hexane/toluene (6:4) | 7.9 | 500 | 8.2 | 3.6 | 3.0 | —SO$_3$Na | 6 |
| 1I | 10.1 | n-hexane/toluene (7:3) | 7.3 | 600 | 8.0 | 3.6 | 3.2 | —SO$_3$Na | 6 |
| 1j | 10.1 | n-hexane | 7.8 | 600 | 7.6 | 3.5 | 5.5 | —SO$_3$Na | 6 |
| 1k | 10.0 | Untreated | — | — | — | 3.2 | 7.4 | —SO$_3$K | 7 |
| 1L | 10.0 | Acetonitrile | 11.9 | 100 | 11.2 | 3.3 | 2.7 | —SO$_3$K | 7 |
| 1M | 10.1 | Acetonitrile | 11.9 | 100 | 11.2 | 3.5 | 2.7 | NA | 0 |
| 1N | 10.1 | Acetonitrile | 11.9 | 100 | 11.5 | 3.5 | 2.8 | —PO(OK)$_3$ | 15 |
| 1O | 10.1 | Acetonitrile | 11.9 | 100 | 11.8 | 3.7 | 2.6 | —COOH | 60 |

In the above table, adding quantity of the poor solvent is the quantity (parts) added to 100 parts of 30% binder resin solution.

[Abbreviations and measuring method]

SP: Solubility parameter (unit: cal$^{1/2}$ cm$^{-3/2}$)

For the solubility parameter of a single type solvent, the values given in "Handbook for Macromolecular Data" (compiled by Macromolecular Association of Japan; published by Baifukan; 1986) were used. Solubility parameter of mixture solvent system was calculated on the assumption that each on the solubility parameters has additivity. To obtain solubility parameter of the binder resin, the binder resin was immersed in a series of solvents having different solubility parameters, and the middle point of the solubility parameters of the solvents to dissolve the binder resin was regarded as the solubility parameter of the binder resin.

Mw: Weight average molecular weight

To obtain weight average molecular weight, gel permeation chromatography HLC-8020 (manufactured by Toso Co., Ltd.) (column composition: G2000H XL×30 cm×1+ G4000H XL×30 cm×1+G5000H XL×30 cm×1; eluate: THF; flow velocity: 1 ml/min.; temperature: 40° C.; detector: RI) was used to obtain molecular weight distribution curve converted to standard polystyrene, and weight average molecular weight was calculated.

For quantitative determination of the low molecular weight components, molecular weight distribution curve obtained by the above apparatus and the measuring conditions was used, and the value was calculated from area ratio of the components having molecular weight of not more than 5,000.

Next, description will be given on the examples of the magnetic recording medium using the compounds manufactured in the above manufacture examples.

EXAMPLE 1

| Preparation of the magnetic coating solution | |
|---|---|
| Ferromagnetic alloy powder | 100 parts |
| Composition: Fe/Zn/Ni (92/4/4) | |
| Hc: | 2000 Oe |
| Crystallite size: | 15 nm |
| BET specific surface area: | 59 m$^2$/g |
| Longer axis diameter: | 0.12 μm |
| Acicular ratio: | 7 |
| σs: | 140 emu/g |
| Binder resin | |
| Polyurethane resin 1C | 10 parts |
| Vinyl chloride resin 1K | 8 parts |
| α-Al$_2$O$_3$ (particle size: 0.3 μm) | 2 parts |
| Carbon black (particle size: 40 nm) | 2 parts |
| Cyclohexanone | 110 parts |
| Methylethylketone | 100 parts |
| Toluene | 100 parts |
| Butyl stearate | 2 parts |
| Stearic acid | 1 part |

In the above magnetic coating material composition, components were kneaded for 60 minutes using an open kneader, and the mixture was then dispersed for 120 minutes in a sand mill. To the dispersion solution thus prepared, 6 parts of 3 functional low molecular weight polyisocyanate compound (Coronate 3041; Nippon Polyurethane Co., Ltd.) were added, and this was agitated and mixed for 20 minutes. Then, this was filtered through a filter having average bore size of 1 μm, and the magnetic coating solution was prepared.

On a polyethylene naphthalate support member of 10 μm in thickness, the non-magnetic coating material prepared above was coated to have the thickness of 3.0 μm after drying. Using a magnet of 3000 Gauss, magnetic field orientation was performed while the magnetic layer was not yet dried. After drying, surface smoothening was performed under the conditions of velocity of 100 m/min., linear pressure of 300 kg/cm, and temperature at 90° C. using a 7-stage calender comprising metallic rolls only. Then, heat curing was performed at 70° C. for 24 hours, and the product was cut to 6.35 mm in width, and a magnetic tape was prepared.

EXAMPLE 2

Example 2 was prepared by the same procedure as in Example 1 except that the polyurethane resin 1C was replaced by the polyurethane resin 1E and the vinyl chloride resin 1K was replaced by the vinyl chloride resin 1L.

EXAMPLE 3

| Preparation of upper layer magnetic coating solution | |
|---|---|
| Ferromagnetic alloy powder | 100 parts |
| Composition: Fe/Zn/Ni (92/4/4) | |
| Hc: | 20000e |
| Crystallite size: | 15 nm |
| BET specific surface area: | 59 m²/g |
| Longer axis diameter: | 0.12 µm |
| Acicular ratio: | 7 |
| σs: | 140 emu/g |
| Binder resin | |
| Polyurethane resin 1C | 10 parts |
| Vinyl chloride resin 1L | 8 parts |
| α-Al₂O₃ (particle size: 0.3 µm) | 2 parts |
| Carbon black (particle size: 40 nm) | 2 parts |
| Cyclohexanone | 110 parts |
| Methylethylketone | 100 parts |
| Toluene | 100 parts |
| Butyl stearate | 2 parts |
| Stearic acid | 1 part |
| Preparation of non-magnetic coating solution for lower layer | |
| Non-magnetic inorganic powder | 85 parts |
| α-iron oxide | |
| Longer axis diameter: | 0.12 µm |
| Acicular ratio: | 7 |
| BET surface area: | 55 m²/g |
| pH: | 6.5 |
| Binder resin | |
| Polyurethane resin 1C | 10 parts |
| Vinyl chloride resin 1L | 8 parts |
| Cyclohexanone | 140 parts |
| Methylethylketone | 170 parts |
| Butyl stearate | 2 parts |
| Stearic acid | 1 part |

For each of the magnetic coating material composition for the upper layer and the non-magnetic coating material composition for the lower layer, components were kneaded for 60 minutes using an open kneader, and the mixture was then dispersed for 120 minutes in a sand mill. To the dispersion solution thus prepared, 6 parts of 3 functional low molecular weight polyisocyanate compound (Coronate 3041; Nippon Polyurethane Co., Ltd.) were added, and this was agitated and mixed for 20 minutes. Then, this was filtered through a filter having average bore size of 1 µm, and the magnetic coating solution was prepared.

On a polyethylene naphthalate support member of 10 µm in thickness, the non-magnetic coating material prepared above was coated to have thickness of 2.5 µm after drying, and immediately thereafter, the magnetic coating material was coated by simultaneous multiple coating to have thickness of 0.5 µm after drying. Using a magnet of 3000 Gauss, magnetic field orientation was performed while the two layers are not yet dried. After drying, surface smoothening was performed under the conditions of velocity of 100 m/min., linear pressure of 300 kg/cm, and temperature at 90° C. using a 7-stage calender comprising metallic rolls only. Then, heat curing was performed at 70° C. for 24 hours, and the product was cut to 6.35 mm in width, and a magnetic tape was prepared.

EXAMPLES 4 to 9; COMPARATIVE EXAMPLES 1 to 4

Examples 4 to 9 and Comparative examples 1 to 4 were prepared by the same procedure as in Example 3 except that the binders used in the magnetic coating material composition for the upper layer and the coating material composition for the lower layer were replaced by the binder resins given in Table 2.

The tapes of Examples and Comparative examples thus prepared were measured in accordance with the measuring methods given below. The results of the measurement are shown in Table 2.

[Measuring methods]

(1) Ra

Using a digital optical profile meter (manufactured by WYKO), average surface roughness at center line was measured by light interference method with cut-off value of 0.25 mm. The obtained value was regarded as Ra.

(2) Electromagnetic transfer characteristics

Using a drum tester, recording and reproduction were performed on the specimen tape under the conditions of recording wavelength of 0.5 µm and head speed of 10 m/sec., and relative reproduction output was evaluated, regarding the reproduction of the standard tape as 0 dB.

(3) Repeated running property (output decrease, head contamination, change of surface binder content)

Using a digital video recorder (NV-BJ1; Matsushita Electric), a tape with 60-minute length was repeatedly and continuously run by 100 times under the environmental conditions of 40° C. and 80% relative humidity. Then, contamination of video head was examined. Also, video output was continuously reproduced, and output decrease was measured with the first output as 0 dB.

(4) Video head contamination score

When no contamination was observed, it was defined as 5 points. When shoulder portion and sliding portion of the head and gap portion were contaminated, and recording and reproduction are practically not achievable, it was defined as 1 point. The status between the above two was defined by relative scores of 4 to 2 points.

(5) Change of surface binder content

Extraction using n-hexane was performed for 30 minutes at room temperature to remove lubricant and the like existing on the surface of the magnetic layer of the tape before and after running. Using ESCA measuring instrument (PHI-5400MC; manufactured by Phi Corporation), measurement was performed at 400 W (15 kV) for 10 minutes on Mg anode. For N, peak intensity ratio of iS of N to 2P3/2 peak of Fe was obtained. For Cl, peak intensity ratio of 1S of Cl to peak of 2P3/2 of Fe was obtained.

TABLE 2

| Examples and Comparative examples | Binder resin for magnetic coating material | | Binder resin for coating material of lower layer | | Layer coating method | Upper layer thickness ($\mu$m) | Lower layer thickness ($\mu$m) | Ra (nm) | Electromag. charac. (dB) | Output decrease (dB) | Head contamination | Change of surface binder content | |
|---|---|---|---|---|---|---|---|---|---|---|---|---|---|
| | Polyurethane | Vinyl chloride | Polyurethane | Vinyl chloride | | | | | | | | $\sigma$ Cl/Fe | $\sigma$ N/Fe |
| 1 | 1C | 1k | — | — | Single layer coating | 3.0 | — | 3.5 | −0.6 | −0.1 | 5 | −0.007 | −0.002 |
| 2 | 1E | 1L | — | — | Single layer coating | 3.0 | — | 3.3 | −0.7 | −0.2 | 4 | −0.009 | −0.003 |
| 3 | 1C | 1L | 1C | 1L | Simultaneous multiple coating | 0.5 | 2.5 | 3.1 | 0.0 | −0.1 | 5 | −0.008 | −0.002 |
| 4 | 1C | 1L | a | 1k | Simultaneous multiple coating | 0.5 | 2.5 | 3.3 | 0.1 | −0.3 | 4 | −0.010 | −0.003 |
| 5 | a | 1k | 1C | 1L | Simultaneous multiple coating | 0.5 | 2.5 | 3.3 | 0.1 | −0.2 | 4 | −0.011 | −0.003 |
| 6 | 1D | 1L | 1D | 1L | Simultaneous multiple coating | 0.5 | 2.5 | 3.3 | −0.1 | −0.2 | 5 | −0.009 | −0.003 |
| 7 | 1E | 1L | 1E | 1L | Simultaneous multiple coating | 0.5 | 2.5 | 3.1 | 0.0 | −0.3 | 4 | −0.012 | −0.004 |
| 8 | 1G | 1L | 1G | 1L | Simultaneous multiple coating | 0.5 | 2.5 | 3.3 | −0.1 | −0.2 | 5 | −0.010 | −0.002 |
| 9 | 1H | 1L | 1H | 1L | Simultaneous multiple coating | 0.5 | 2.5 | 3.1 | 0.1 | −0.3 | 4 | −0.011 | −0.003 |
| 10 | 1M | 1L | 1M | 1L | Simultaneous multiple coating | 0.5 | 2.5 | 4.8 | −1.7 | −0.5 | 3 | −0.016 | −0.007 |
| 11 | 1N | 1L | 1N | 1L | Simultaneous multiple coating | 0.5 | 2.5 | 3.9 | −0.9 | −0.6 | 4 | −0.011 | −0.006 |
| 12 | 1O | 1L | 1O | 1L | Simultaneous multiple coating | 0.5 | 2.5 | 4.3 | −1.1 | −0.4 | 4 | −0.012 | −0.005 |
| Comparative example 1 | a | 1k | — | — | Single layer coating | 3.0 | — | 3.4 | −0.7 | −1.5 | 2 | −0.028 | −0.008 |
| Comparative example 2 | 1f | 1k | — | — | Single layer coating | 3.0 | — | 3.3 | −0.8 | −1.6 | 1 | −0.023 | −0.006 |
| Comparative example 3 | a | 1k | a | 1k | Simultaneous multiple coating | 0.5 | 2.5 | 3.2 | −0.7 | −1.6 | 2 | −0.030 | −0.010 |
| Comparative example 4 | 1f | 1k | 1f | 1k | Simultaneous multiple coating | 0.5 | 2.5 | 3.3 | −0.6 | −1.7 | 1 | −0.028 | −0.009 |

(manufacture example of polyurethane 2B)

To 100 parts of solution of polyurethane resin "a" (weight average molecular weight 35,000; Low molecular weight components having molecular weight of not more than 5,000: 5.5 weight %—binder; Polar groups: $6 \times 10^{-5}$ eq/g—binder; Solid matters: 30 weight %; Solvent composition: cyclohexanone/dimethylacetamide (1:1), 100 parts (ratio to resin solution: 1.0) of acetonitrile (solubility parameter: 11.9) were added bit by bit to have phase separation. In this case, the lower layer was the resin dense phase. After leaving this to stand for 24 hours, thin (dilute) phase in the upper layer was removed, and a mixture solvent containing cyclohexanone and dimethylacetamide (1:1) was added and dissolved again to have solid matter concentration at 30 weight % level.

In the polyurethane resin 2B thus prepared, weight average molecular weight was 36,000, the content of low molecular weight components having molecular weight of not more than 5,000 was 3 weight %—binder; and the content of polar groups was $6\times10^{-5}$ eq/g—binder. Yield ratio of the prepared resin to the raw material resin was 88%.

(Manufacture examples of polyurethane resins 2C, 2D, 2E, 2F and 2H)

These polyurethane resin were prepared by the same procedure as in the manufacture example of the polyurethane resin 2B except that type and quantity of the poor solvents were changed as shown in Table 3. The ratio of low molecular weight components and polar groups of the polyurethane resin thus obtained are shown in Table 3.

(Manufacture examples of polyurethane resins 2G and 2I)

In the procedure of the manufacturing example of the polyurethane resin 2B, type and quantity of the poor solvents were changed as shown in Table 3. After adding and agitating, this was left to stand for 24 hours. Then, solid matters were removed, and the solvent was dried. The solid matters were diluted using a mixture solvent containing cyclohexanone and dimethylacetamide (1:1) and a solution of 30% concentration was prepared. Molecular weight and polar group ratio were as shown in Table 3.

(Manufacture example of vinyl chloride resin 2A)

To copolymer of vinyl chloride/vinyl acetate/allylglycidyl ether/2-hydroxyethyl methacrylate (85/5/5/5) (mol %), —$SO_3Na$ group was introduced and added. (—$SO_3Na$: $6\times10^{-5}$ eq/g; epoxy group: $50\times10^{-5}$ eq/g; OH group: $30\times10^{-5}$ eq/g; Mw: 30,000).

(Manufacture example of vinyl chloride resin 2B)

Vinyl chloride resin solution 2B was prepared by the same procedure as in the manufacture example of the polyurethane resin 2B except that a solution in the solvent containing cyclohexanone and dimethylacetamide (1:1) of vinyl chloride resin 2A (solid matter concentration: 30%) instead of the polyurethane resin "a".

(Manufacture example of polyurethane resin 2J)

In the composition of the polyurethane resin "a", the ratio of neopentyl glycol was changed to 20 mol %, and ethylene glycol addition product to sodium sulfoisophthalate was changed to 0 mol %. The polyurethane resin (Mw: 35,000) having no polar group was processed in the same manner as the polyurethane resin 2B, and the ratio of lower molecular weight components was set to 3.0 weight %.

(Manufacture examples of polyurethane resins 2K and 2L)

Polyurethane resins 2K and 2L were prepared by the same procedure as in the manufacture example of the polyurethane resin 2B except that the polar groups were changed to COOH ($10\times10^{-5}$ eq/g and $60\times10^{-5}$ eq/g) respectively.

Molecular weight and polar group content of each of the resins prepared above are as shown in Table 3.

TABLE 3

| Binder resin | Poor solvent | | Low molecular | Weight average | Polar groups | |
|---|---|---|---|---|---|---|
| | Type and q'ty | (ratio to resin solution) | weight components content (weight %) | molecular weight (Mw) (in 10,000) | Type and q'ty $\times 10^{-5}$ eq/g | |
| Polyurethane 2B | Acetonitrile | 1.0 | 2.3 | 3.6 | $SO_3Na$ | 6 |
| Polyurethane 2C | Acetonitrile | 0.5 | 3.0 | 3.7 | $SO_3Na$ | 6 |
| Polyurethane 2D | Acetonitrile | 2.0 | 1.7 | 3.6 | $SO_3Na$ | 6 |
| Polyurethane 2E | Acetonitrile | 3.0 | 3.0 | 3.6 | $SO_3Na$ | 6 |
| Polyurethane 2F | Acetonitrile/MEK = 9/1 | 4.0 | 3.7 | 3.5 | $SO_3Na$ | 6 |
| Polyurethane 2G | n-hexane | 6.0 | 4.9 | 3.5 | $SO_3Na$ | 6 |
| Polyurethane 2H | n-hexane | 0.3 | 5.5 | 3.5 | $SO_3Na$ | 6 |
| Polyurethane 2I | Methanol | 0.0 | 4.2 | 3.5 | $SO_3Na$ | 6 |
| Vinyl chloride resin 2A | NA | NA | 7.4 | 3.2 | $SO_3K$ | 6 |
| Vinyl chloride resin 2B | Acetonitrile | 1.0 | 2.7 | 3.3 | $SO_3K$ | 7 |
| Polyurethane 2J | Acetonitrile | 1.0 | 3.0 | 3.5 | NA | 0 |
| Polyurethane 2K | Acetonitrile | 1.0 | 3.0 | 3.5 | COOH | 10 |
| Polyurethane 2L | Acetonitrile | 1.0 | 3.0 | 3.5 | COOH | 60 |

In Table 3, content of lower molecular weight components and weight average molecular weight were calculated by the same procedure as in the resins shown in Table 1.

EXAMPLES 10 TO 14 AND 18 TO 20; COMPARATIVE EXAMPLES 5 to 10

Magnetic tapes of Examples 10 to 14 and Comparative examples 5 to 10 were prepared by the same procedure as in Example 1 except that the binder in the magnetic coating solution in Example 1 was replaced by the binders shown in Table 3. By the measuring methods described above, the properties of the magnetic tapes were measured. The results of the measurement are shown in Table 4.

TABLE 4

| Examples and Comparative examples | Binder resin | Surface roughness Ra (nm) | C/N (dB) | Output decrease (dB) | Head contamination | Surface wearing σ N/Fe | Surface wearing σ Cl/Fe |
|---|---|---|---|---|---|---|---|
| Example 10 | Polyurethane 2B | 3.2 | −0.5 | −0.2 | 5 | −0.000 | |
| Example 11 | Polyurethane 2C | 3.3 | −0.4 | −0.3 | 5 | −0.003 | |
| Example 12 | Polyurethane 2D | 3.3 | −0.5 | −0.2 | 5 | −0.000 | |
| Example 13 | Polyurethane 2E | 3.2 | −0.5 | −0.3 | 5 | −0.002 | |
| Example 18 | Polyurethane 2J | 4.8 | −1.5 | −0.5 | 4 | −0.005 | |
| Example 19 | Polyurethane 2K | 3.9 | −0.7 | −0.4 | 4 | −0.004 | |
| Example 20 | Polyurethane 2L | 4.2 | −0.9 | −0.6 | 3 | −0.007 | |
| Comparative example 5 | Polyurethane 2A | 3.3 | −0.5 | −1.5 | 1 | −0.012 | |
| Comparative example 6 | Polyurethane 2F | 3.3 | −0.5 | −0.9 | 2 | −0.010 | |
| Comparative example 7 | Polyurethane 2G | 3.4 | −0.6 | −1.4 | 1 | −0.013 | |
| Comparative example 8 | Polyurethane 2H | 3.3 | −0.5 | −1.4 | 1 | −0.013 | |
| Comparative example 9 | Polyurethane 2I | 3.2 | −0.4 | −1.2 | 2 | −0.011 | |
| Example 14 | Vinyl chloride resin 2B | 3.1 | −0.4 | −0.3 | 5 | | −0.001 |
| Comparative example 10 | Vinyl chloride resin 2B | 3.1 | −0.4 | −0.9 | 2 | | −0.036 |

EXAMPLES 15, 16, AND 17; COMPARATIVE EXAMPLES 11

Magnetic tapes of Examples 15 to 17 and Comparative example 11 were prepared by the same procedure as in Example 3 except that the binder for the magnetic coating solution for the upper layer and the binder for the non-magnetic coating solution for the lower layer of Example 3 were changed to the binders shown in Table 3. The properties of the magnetic tapes were measured in accordance with the measuring methods described above. The results of the measurement are shown in Table 5.

TABLE 5

| | Binder resin Upper layer | Binder resin Lower layer | Surface roughness Ra (nm) | C/N (dB) | Output decrease (dB) | Head contamination | Surface wearing σ N/Fe |
|---|---|---|---|---|---|---|---|
| Example 15 | Polyurethane 2B | Polyurethane 2B | 2.9 | 0.0 | −0.2 | 5 | −0.000 |
| Example 16 | Polyurethane 2B | Polyurethane 2A | 2.8 | 0.1 | −0.4 | 4 | −0.003 |
| Example 17 | Polyurethane 2A | Polyurethane 2B | 2.8 | 0.1 | −0.3 | 5 | −0.001 |
| Comparative example 11 | Polyurethane 2A | Polyurethane 2A | 2.8 | 0.0 | −1.4 | 1 | −0.002 |

(Manufacture example of polyurethane resin 3B)

Using 4400 parts of a mixture solvent containing cyclohexanone and methylethylketone (6:4), 1600 parts of the solution of the polyurethane resin "a" were diluted. Viscosity of this binder solution at 75° C. was 21 centipoises. Using an ultrafiltration membrane made of ceramics (manufactured by NGK Insulators, Ltd.) having average bore size of 100 nm and membrane area of 1 $m^2$, ultrafiltration of the binder solution was performed for 2 hours by supplementing the mixture solvent containing cyclohexanone and methylethylketone (6:4) in the same quantity as that of the permeated solvent. In the binder resin thus prepared, weight average molecular weight was 37,000, the content of low molecular weight components having molecular weight of not more than 5,000 was 1.8 weight %—binder, and the content of polar groups was $6 \times 10^{-5}$ eq/g—binder. Yield ratio to the quantity of the binder resin before processing was 70%.

(Manufacture example of polyurethane resin 3C)

Polyurethane resin 3C was prepared by the same procedure as in the manufacture example of the polyurethane resin 3B by processing for 2 hours except that average bore size of the ultrafiltration membrane was changed to 50 nm. In the polyurethane resin 3C thus prepared, average weight molecular weight was 36,000, the content of low molecular weight components having molecular weight of not more than 5,000 was 2.4 weight %—binder, and the content of polar groups was $6 \times 10^{-5}$ eq/g—binder. Yield ratio to the quantity of the binder resin before processing was 85%.

(Manufacture example of polyurethane resin 3D)

Polyurethane resin 3D was prepared by processing for 2 hours by the same procedure as in the manufacture example of the polyurethane resin 3B except that average bore size of the ultrafiltration membrane was changed to 10 nm. In the polyurethane resin 3D thus prepared, weight average molecular weight was 36,000, the content of low molecular weight components having molecular weight of not more than 5,000 was 2.7 weight %—binder, and the content of polar group was $6 \times 10^{-5}$ eq/g—binder. Yield ratio to the quantity of the binder resin before processing was 93%.

(Manufacture example of polyurethane resin 3E) Polyurethane resin 3E was prepared by processing for 6 hours by the same procedure as in the manufacture example of the polyurethane resin 3D except that the processing temperature was changed to 50° C. In the polyurethane resin 3E thus prepared, weight average molecular weight was 36,000, the content of low molecular weight components having molecular weight of not more than 5,000 was 2.8 weight %—binder, and the content of polar groups was $6 \times 10^{-5}$ eq/g—binder. Yield ratio to the quantity of the binder resin before processing was 94%.

(Manufacture example of polyurethane resin 3F)

Polyurethane resin 3F was prepared by processing for 8 hours by the same procedure as in the manufacture example of the polyurethane resin 3D except that the processing temperature was changed to 25° C. In the polyurethane resin 3F thus prepared, weight average molecular weight was 36,000, the content of low molecular weight components having molecular weight of not more than 5,000 was 3.0 weight 5—binder, and the content of polar groups was $6 \times 10^{-5}$ eq/g—binder. Yield ratio to the quantity of the binder resin before processing was 99%.

(Manufacture example of polyurethane resin 3G)

Polyurethane resin 3G was prepared by processing for 10 hours by the same procedure as in the manufacture example of the polyurethane resin 3B except that average bore size of the ultrafiltration membrane used was changed to 5 nm. In the polyurethane resin 3G thus prepared, weight average molecular weight was 35,000, the content of low molecular weight components having molecular weight of not more than 5,000 was 3.0 weight %—binder, and the content of polar groups was $6 \times 10^{-5}$ eq/g—binder. Yield ratio to the quantity of the binder resin before processing was 97%.

(Manufacture example of polyurethane 3H)

Polyurethane resin 3H was prepared by processing for 6 hours by the same procedure as in the manufacture example of the polyurethane resin 3B except that average bore size of the ultrafiltration membrane was changed to 3nm. In the polyurethane resin 3H thus prepared, weight average molecular weight was 36,000, the content of low molecular weight components having molecular weight of not more than 5,000 was 3.6 weight %—binder, and the content of polar groups was $6 \times 10^{-5}$ eq/g—binder. Yield ratio to the quantity of the binder resin before processing was 98%.

(Manufacture example of vinyl chloride resin 3I)

This was prepared by introducing —SO$_3$Na group to copolymer of vinyl chloride/vinyl acetate/allylglycidyl ether/2-hydroxyethyl methacrylate (85/5/5/5) (mol %). Weight average molecular weight was 32,000, the content of low molecular weight components having molecular weight of not more than 5,000 was 8 weight %—binder, and the content of polar groups was $6 \times 10^{-5}$ eq/g—binder.

(Manufacture example of vinyl chloride resin 3J)

Vinyl chloride resin 3J was prepared by processing for 3 hours by the same procedure as in the manufacture example of the polyurethane 3D except that the solution of polyurethane resin was replaced by a solution, which was obtained by dissolving 600 parts of vinyl chloride resin 1i in 5400 parts of mixed solvent containing cyclohexanone and methylethylketone (6:4) to have solid matters at 10 weight % level. Viscosity of the solution before processing at temperature of 75° C. was 15 centipoises. In the binder resin thus prepared, weight average molecular weight was 33,000, the content of low molecular weight components having molecular weight of not more than 5,000 was 3.0 weight %—binder, and the content of polar groups was $6 \times 10^{-5}$ eq/g—binder. Yield ratio to the binder resin before processing was 80%.

Manufacture examples of the binder resins are summarized in Table 6.

TABLE 6

| | Filtration | Ultrafiltration processing | | | Binder resin obtained | | | |
| --- | --- | --- | --- | --- | --- | --- | --- | --- |
| | membrane Average | | Viscosity of | | Mw | Content of low molecular weight components | Polar group | |
| Type of binder | bore size (nm) | Temperature (° C.) | solution (cP) | Time (hours) | (in 10,000) | (%) | Type | Content $10^{-5}$ eq/g |
| Polyurethane 3b | 100 | 75 | 21 | 2 | 3.7 | 1.8 | —SO$_3$Na | 6 |
| Polyurethane 3C | 50 | 75 | 21 | 2 | 3.6 | 2.4 | —SO$_3$Na | 6 |
| Polyurethane 3D | 10 | 75 | 21 | 2 | 3.6 | 2.7 | —SO$_3$Na | 6 |
| Polyurethane 3E | 10 | 50 | 34 | 6 | 3.6 | 2.8 | —SO$_3$Na | 6 |
| Polyurethane 3F | 10 | 25 | 62 | 8 | 3.6 | 3.0 | —SO$_3$Na | 6 |
| Polyurethane 3G | 5 | 75 | 21 | 10 | 3.5 | 3.0 | —SO$_3$Na | 6 |
| Polyurethane 3H | 3 | 75 | 21 | 6 | 3.6 | 3.6 | —SO$_3$Na | 6 |
| Vinyl chloride resin 3J | 10 | 75 | 15 | 3 | 3.3 | 3.0 | —SO$_3$Na | 6 |
| Polyurethane 3K | 10 | 75 | 21 | 2 | 3.5 | 2.7 | NA | 0 |
| Polyurethane 3L | 10 | 75 | 21 | 2 | 3.5 | 2.8 | —PO(OK)$_3$ | 15 |
| Polyurethane 3M | 10 | 75 | 21 | 2 | 3.7 | 2.6 | —COOH | 60 |

In Table 6, the content of low molecular weight components and weight average molecular weight were determined by the same procedure as for the resin shown in Table 1.

EXAMPLES 21 AND 22; COMPARATIVE EXAMPLES 12 AND 13

Magnetic tapes of Examples 21 and 22 and Comparative examples 12 and 13 were prepared by the same procedure as in Example 1 except that the binder in the magnetic coating solution of Example 1 was replaced by the binders shown in Table 6. The properties of the magnetic tapes were measured in accordance with the measuring methods described above. The results are shown in Table 7.

EXAMPLES 23 TO 32; COMPARATIVE EXAMPLES 14 AND 15

Magnetic tapes of Examples 23 to 32 and Comparative examples 14 and 15 were prepared by the same procedure as in Example 3 except that the binders in the upper layer magnetic coating solution and the binders of the non-magnetic coating solution for the lower layer of Example 3 were replaced by the binders shown in Table 6. The properties of the magnetic tapes were measured in accordance with the measuring methods described above, and the results are shown in Table 7.

TABLE 7

| Examples and Comparative examples | Binder resin for magnetic coating material | | Binder resin for coating material of lower layer | | Layer coating method | Upper layer thickness ($\mu$m) | Lower layer thickness ($\mu$m) | Ra (nm) | Electromag. charac. (dB) | Output decrease (dB) | Head contamination score | Change in surface binder content | |
|---|---|---|---|---|---|---|---|---|---|---|---|---|---|
| | Polyurethane | vinyl chloride | Polyurethane | vinyl chloride | | | | | | | | $\sigma$ Cl/Fe | $\sigma$ N/Fe |
| 21 | 3D | 3J | — | — | Single layer coating | 3.0 | — | 3.5 | −0.6 | −0.1 | 5 | −0.007 | −0.002 |
| 22 | 3D | 3i | — | — | Single layer coating | 3.0 | — | 3.4 | −0.7 | −0.2 | 4 | −0.010 | −0.003 |
| 23 | 3D | 3J | 3D | 3J | Simultaneous multiple coating | 0.5 | 2.5 | 3.1 | 0.0 | −0.1 | 5 | −0.008 | −0.002 |
| 24 | 3D | 3J | a | 3i | Simultaneous multiple coating | 0.5 | 2.5 | 3.2 | −0.1 | −0.3 | 4 | −0.014 | −0.004 |
| 25 | a | 3i | 3D | 3J | Simultaneous multiple coating | 0.5 | 2.5 | 3.3 | 0.1 | −0.2 | 4 | −0.012 | −0.003 |
| 26 | 3E | 3J | 3E | 3J | Simultaneous multiple coating | 0.5 | 2.5 | 3.2 | 0.1 | −0.2 | 5 | −0.009 | −0.003 |
| 27 | 3F | 3J | 3F | 3J | Simultaneous multiple coating | 0.5 | 2.5 | 3.2 | 0.0 | −0.3 | 4 | −0.012 | −0.004 |
| 28 | 3C | 3J | 3C | 3J | Simultaneous multiple coating | 0.5 | 2.5 | 3.3 | −0.1 | −0.2 | 5 | −0.009 | −0.003 |
| 29 | 3G | 3J | 3G | 3J | Simultaneous multiple coating | 0.5 | 2.5 | 3.1 | −0.1 | −0.3 | 4 | −0.012 | −0.004 |
| 30 | 3K | 3J | 3K | 3J | Simultaneous multiple coating | 0.5 | 2.5 | 4.7 | −1.6 | −0.4 | 3 | −0.015 | −0.006 |
| 31 | 3L | 3J | 3L | 3J | Simultaneous multiple coating | 0.5 | 2.5 | 3.8 | −0.8 | −0.5 | 4 | −0.012 | −0.005 |
| 32 | 3M | 3J | 3M | 3J | Simultaneous multiple coating | 0.5 | 2.5 | 4.2 | −1.0 | −0.6 | 4 | −0.013 | −0.004 |
| Comparative example 12 | 3a | 3i | — | — | Single layer coating | 3.0 | — | 3.5 | −0.7 | −1.6 | 2 | −0.029 | −0.012 |
| Comparative example 13 | 3h | 3i | — | — | Single layer coating | 3.0 | — | 3.3 | −0.8 | −1.5 | 1 | −0.025 | −0.010 |
| Comparative example 14 | a | 3i | 3a | 3i | Simultaneous multiple coating | 0.5 | 2.5 | 3.4 | −0.7 | −1.7 | 2 | −0.029 | −0.009 |
| Comparative example 15 | 3h | 3i | 3h | 3i | Simultaneous multiple coating | 0.5 | 2.5 | 3.3 | −0.6 | −1.6 | 1 | −0.027 | −0.009 |

What we claim are:

1. A method for manufacturing a binder for a magnetic recording medium by removing low molecular weight components from the binder, comprising dissolving a binder having a weight average molecular weight of from 10,000 to 60,000 in a solvent to form a solution and separating low molecular weight components from the binder by a separation method selected from fractional precipitation, liquid phase separation by adding a poor solvent, or by use of an ultrafiltration membrane, wherein the content of low molecular weight components having a molecular weight of not more than 5,000 is reduced to not more than 3.0 weight % of total weight of the binder.

2. A method for manufacturing a binder for a magnetic recording medium according to claim 1, wherein said separation method is by fractional precipitation comprising adding a poor solvent to the solution, wherein said poor solvent has a solubility parameter that is 1.3 cal$^{1/2}$ cm$^{-3/2}$ more than and 2.3 cal$^{1/2}$ cm$^{-3/2}$ less than the solubility parameter of the binder and has no active hydrogen, and wherein the solubility parameter of the solvent in the solution after adding the poor solvent and mixing is 1.0 cal$^{1/2}$ cm$^{-3/2}$ more than and 2.0 cal$^{1/2}$ cm$^{-3/2}$ less than the solubility parameter of the binder.

3. A method for manufacturing a binder for a magnetic recording medium according to claim 2, wherein said poor solvent is acetonitrile or a mixed solvent containing at least acetonitrile.

4. A method for manufacturing a binder for a magnetic recording medium according to claim 2, wherein said poor solvent is a mixed solvent comprising hexane and toluene.

5. A method for manufacturing a binder for a magnetic recording medium according to claim 1, wherein said separation method is by liquid phase separation comprising adding a poor solvent in an amount of 0.5 to 3 times an amount of the binder solution and separating the solution formed into a first liquid layer having a higher number of low molecular weight components dissolved therein and a second liquid layer having a higher number of high molecular weight components dissolved therein, and removing the first liquid layer, wherein the low molecular weight components are removed.

6. A method for manufacturing a magnetic recording medium according to claim 5, wherein said poor solvent has no active hydrogen in the molecule.

7. A method for manufacturing a binder for a magnetic recording medium according to claim 5, wherein said poor solvent is acetonitrile or a mixed solvent selected from acetonitrile and cyclohexanone, acetonitrile and methylethylketone or acetonitrile and toluene.

8. A method for manufacturing a binder for a magnetic recording medium according to claim 1, wherein the ultrafiltration membrane is made of ceramics and has an average bore size of 5 to 50 nm.

9. A method for manufacturing a binder for a magnetic recording medium according to claim 1, wherein said separation method is by use of an ultrafiltration membrane comprising filtering with an ultrafiltration membrane, adding a solvent to the solution in the same amount as an amount of the solvent passing through the ultrafiltration membrane from the binder solution, and heating the solution to a temperature that is 5° C. lower than the boiling point of a solvent having the lowest boiling point in the solution, wherein a viscosity of the binder solution thus obtained is not higher than 40 centipoises.

10. A method for manufacturing a binder for a magnetic recording medium according to any one of claims 1 to 9, wherein said binder contains at least one polar group selected from —SO$_3$M, —PO(OM)$_3$, —COOM, wherein M represents a hydrogen atom, an alkali metal or an ammonium salt, or an amino group, and the content of said at least one polar group is from 1×10$^{-5}$ to 60×10$^{-5}$ eq/g.

11. A magnetic recording medium, comprising a non-magnetic support member and a magnetic layer on the non-magnetic support member, said magnetic layer comprising a ferromagnetic powder and a binder, wherein the binder has a content of low molecular weight components having molecular weight of not more than 5,000 of not more than 3 weight % of total weight of the binder, said binder being made by dissolving a binder having a weight average molecular weight within the range of 10,000 to 60,000 in a solvent to form a solution and separating the low molecular weight components from the binder by a separation method selected from fractional precipitation, liquid phase separation by adding a poor solvent, or by use of an ultrafiltration membrane, wherein the content of low molecular weight components having molecular weight of not more than 5,000 is reduced to not more than 3 weight % of total weight of the binder.

12. A magnetic recording medium, comprising a non-magnetic support member, a lower coating layer on the non-magnetic support member comprising at least one magnetic powder or non-magnetic powder and a binder, and a magnetic layer on said lower coating layer containing a ferromagnetic metal powder and a binder, wherein at least one of the binders in the lower coating layer or the magnetic layer has a content of low molecular weight components having molecular weight of not more than 5,000 of not more than 3 weight % of total weight of the binder, said binder being made by dissolving a binder having a weight average molecular weight within the range of 10,000 to 60,000 in a solvent to form a solution, and separating the low molecular weight components from the binder by a separation method selected from fractional precipitation, liquid phase separation by adding a poor solvent, or by use of an ultrafiltration membrane, wherein the content of low molecular weight components having molecular weight of not more than 5,000 is reduced to not more than 3 weight % of total weight of the binder.

13. A magnetic recording medium according to claims 11 or 12, wherein said separation method is by fractional precipitation comprising adding a poor solvent to the solution, wherein said poor solvent has a solubility parameter that is 1.3 cal$^{1/2}$cm$^{3/2}$ more than and 2.3 cal$^{1/2}$cm$^{3/2}$ less than the solubility parameter of the binder and has no active hydrogen, and wherein the solubility parameter of the solvent in the solution after adding the poor solvent and mixing is 1.0 cal$^{1/2}$ cm$^{3/2}$ and 2.0 cal$^{1/2}$ cm$^{3/2}$ the solubility parameter of the binder.

14. A magnetic recording medium according to claim 13, wherein said poor solvent is acetonitrile or a mixed solvent containing at least acetonitrile.

15. A magnetic recording medium according to claim 14, wherein said binder contains at least one polar group selected from —SO$_3$M, —PO(OM)$_3$, —COOM, wherein M represents a hydrogen atom, an alkali metal or an ammonium salt, or an amino group, and the content of said at least one polar group is from 1×10$^{-5}$ to 60×10$^{-5}$ eq/g.

16. A magnetic recording medium according to claim 15, wherein said binder contains at least one polar group selected from —SO$_3$M, —PO(OM)$_3$, —COOM, wherein M represents a hydrogen atom, an alkali metal or an ammonium salt, or an amino group, and the content of said at least one polar group is from 1×10$^{-5}$ to 60×10$^{-5}$ eq/g.

17. A magnetic recording medium according to one of claims 11 or 12, wherein said binder contains at least one polar group selected from —$SO_3M$, —$PO(OM)_3$, —COOM, wherein M represents a hydrogen atom, an alkali metal or an ammonium salt, or an amino group, and the content of said at least one polar group is from $1 \times 10^{-5}$ to $60 \times 10^{-5}$ eq/g.

18. A magnetic recording medium according to claim 11 or 12, wherein said separation method is by liquid phase separation comprising adding a poor solvent in an amount of 0.5 to 3 times an amount of the binder solution and separating the solution formed into a first liquid layer having a higher number of low molecular weight components dissolved therein and a second liquid layer having a higher number of high molecular weight components dissolved therein, and removing the first liquid layer, wherein the low molecular weight components are removed.

19. A magnetic recording medium according to claim 18, wherein said poor solvent has no active hydrogen in the molecule.

20. A magnetic recording medium according to claim 19, wherein said binder contains at least one polar group selected from —$SO_3M$, —$PO(OM)_3$, —COOM, wherein M represents a hydrogen atom, an alkali metal or an ammonium salt, or an amino group, and content of said at least one polar group is from $1 \times 10^{-5}$ to $60 \times 10^{-5}$ eq/g.

21. A magnetic recording medium according to claim 18, wherein said binder contains at least one polar group selected from —$SO_3M$, —$PO(OM)_3$, —COOM, wherein M represents a hydrogen atom, an alkali metal or an ammonium salt, or an amino group, and content of said at least one polar group is from $1 \times 10^{-5}$ to $60 \times 10^{-5}$ eq/g.

22. A magnetic recording medium according to one of claims 11 or 12, wherein said binder is manufactured by the ultrafiltration process performed using an ultrafiltration membrane made of ceramics and having average bore size of 5 to 50 nm.

23. A magnetic recording medium according to claims 11 or 12, wherein said separation method is by use of an ultrafiltration membrane comprising filtering with an ultrafiltration membrane, adding a solvent to the solution in the same amount as an amount of the solvent passing through the ultrafiltration membrane from the binder solution, and heating the solution to a temperature that is 5° C. lower than the boiling point of a solvent having the lowest boiling point in the solution, wherein a viscosity of the binder solution thus obtained is not higher than 40 centipoises.

* * * * *